Jan. 3, 1967 E. O. MENEFEE ET AL 3,295,386
THREE-AXIS CONTROLLER
Filed April 27, 1964 6 Sheets-Sheet 1

INVENTORS
EARL O. MENEFEE
ALBERT A. PUCCINELLI
BY
ATTORNEYS

INVENTORS
EARL O. MENEFEE
ALBERT A. PUCCINELLI

BY
ATTORNEYS

Jan. 3, 1967  E. O. MENEFEE ET AL  3,295,386
THREE-AXIS CONTROLLER
Filed April 27, 1964  6 Sheets-Sheet 4

INVENTORS
EARL O. MENEFEE
ALBERT A. PUCCINELLI
BY
ATTORNEYS

INVENTORS
EARL O. MENEFEE
ALBERT A. PUCCINELLI

BY
ATTORNEYS

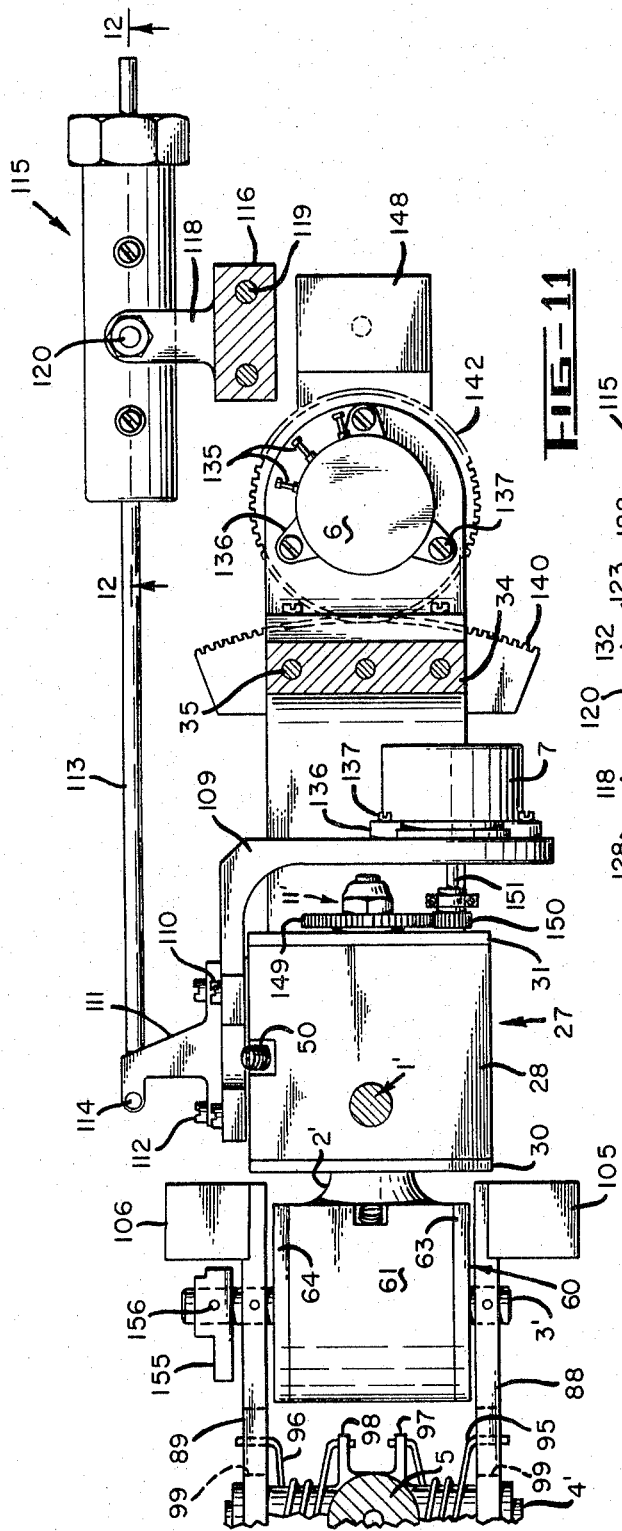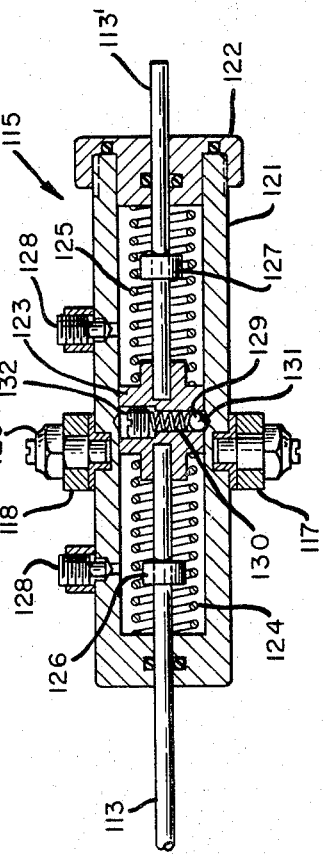

United States Patent Office 3,295,386
Patented Jan. 3, 1967

3,295,386
THREE-AXIS CONTROLLER
Earl O. Menefee, Mountain View, and Albert A. Puccinelli, San Jose, Calif., assignors to the United States of America as represented by the Administrator of the National Aeronautics and Space Administration
Filed Apr. 27, 1964, Ser. No. 363,348
35 Claims. (Cl. 74—471)

The invention described herein may be manufactured and used by or for the Government of the United States of America for governmental purposes without the payment of any royalties thereon or therefor.

This invention relates to means for utilizing hand motion for controlling movement of apparatus located at a position remote from the operator, and more particularly to a controller for controlling motion about three axes.

The controller according to the invention is designed primarily for use as a sidearm control in air or space craft. When used in such environment the controller provides for control about the three conventional aircraft axes. More specifically, the controller provides for control about the usual three orthogonal axes, namely the pitch axis, the yaw axis and the roll axis. In addition to its use in flight craft the controller is also useful in other fields such as remote control handling of radio active materials, control of equipment by an invalid who has the use of one hand, use in the various transportation fields for remote control of steering and braking, and in general, use wherever it is advantageous to control forces from a remote position.

In some fields of use of remote controls, special conditions are involved which require that substantial improvements be made in existing controllers. For example, in the field of air or space craft high accelerations are frequently encountered as a result of sudden changes in speed or direction or both. Such conditions of high acceleration call for the pilot's feet to be restrained in a way that eliminates the use of the rudder pedals usually associated with yaw control in an aircraft. Similarly, use of the common control stick is eliminated because of the danger that the human arm will vary the position of a control stick involuntarily due to high accelerations. As a matter of fact, the optimum design for operation of modern high acceleration flight craft is one in which the pilot is restrained in all of his normal movements as much as possible, allowing only movements of small masses, such as a hand, that are actuated by relatively large muscles capable of overcoming the acceleration loads imposed upon them.

Accordingly, an object of the invention is to provide an improved controller which can be manipulated by an operator who has relatively little freedom of movement. More specifically, it is an object of the invention to provide a controller which can be moved about three axes by one hand under conditions where the forearm is strapped in a fixed position.

One of the main problems encountered in attempting to operate a controller with the operator's forearm held immobile is in connection with motion to control pitch. With the forearm held immobile it is extremely difficult to make the hand move straight forward or backward or straight up and down. The only available motion is a combination up and down and pivotal motion. Prior controllers contained only a single axis about which the described up and down and pivotal motion of the hand must be translated and the results are not satisfactory.

Accordingly, an additional object of the invention is to provide a controller capable of motion in pitch control which simulates the described up and down and pivotal motion of the hand.

As previously explained, one of the environments for which the invention is designed involves substantial acceleration forces, and therefore a further object of the invention is to provide a controller which is completely balanced about all of its control axes.

A related object of the invention is to provide a controller which is biased to return to a centered position about each of its axes so that in a hand-off condition the controller will automatically assume a neutral position.

A further related object of the invention is to provide a controller which is damped about each axis to prevent oscillation when the controller handle is released to return to neutral position.

An additional object of the invention is to provide a three axes controller and means for locking out control motion about one of said axes.

By way of brief description a controller according to the invention is designed so that the three axes of motion are kept as close as possible to the centroids of the governing or controlling wrist and hand. The controller is designed so that the arm rests directly on the mounting box in which the control mechanism is contained. The hand grasps a formed handle which sweeps sideways for yaw action about an axis which passes upwardly through the wrist. The handle can also be rotated about a longitudinal axis parallel to the arm and directly below it for roll control. The pitch control is arranged so that it can be operated through a combined vertical motion and change of angular position of the hand. To allow the human hand to adapt to the many motions required of it the hand and wrist are supported by multiple bone structure as compared to the usual ball and socket construction of other terminal bone end-joints. This, however, results in a motion about a multiplicity of centers instead of the usual one common point. To provide for this complicated motion of the human hand, the pitch mechanism of the controller has two horizontal transverse axes arranged one behind the other. One is directly beneath the handle and the second is a short distance back toward the wrist, beneath the metacarpal bones of the hand. The combination motion about these two pivots approximately simulates the complex motion of the hand and wrist in pitch control. Each axis of the controller is arranged as close as possible to the equivalent axis of the hand and wrist.

Other and further objects and features of advantage will become apparent from the following detailed description wherein reference is made to the accompanying drawings in which:

FIGURE 11 is a top view of the mechanism under the top of the support frame for the controller and is taken on line 11—11 of FIG. 4; and FIGURE 12 is a cross sectional view of the yaw bungee and is taken on the line 12—12 of FIG. 11.

Figure 1:
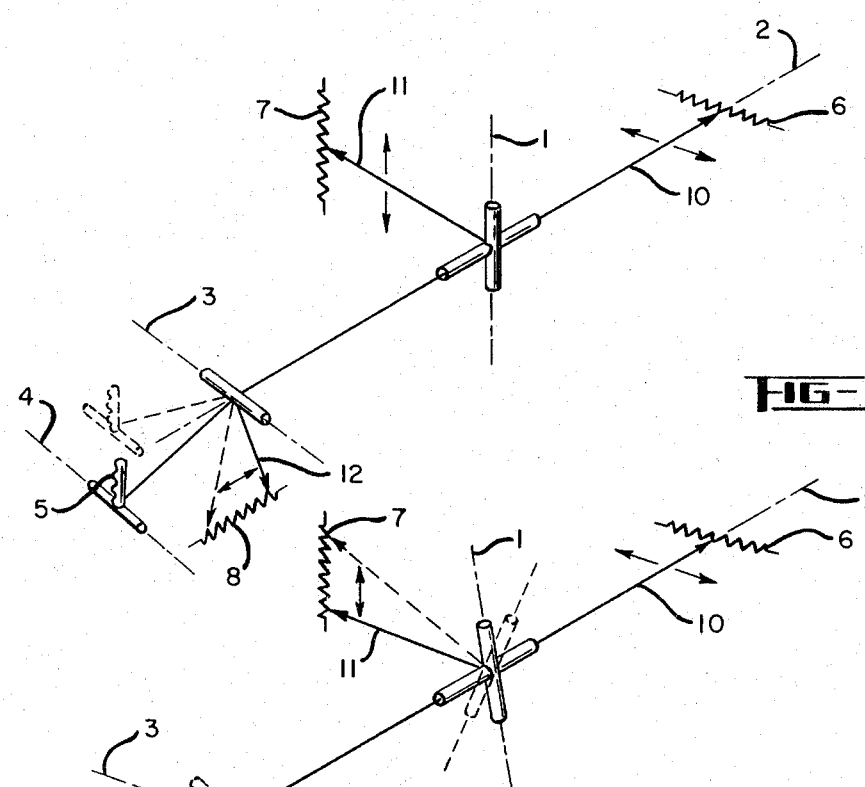
FIGURE 1 is a schematic perspective view providing an overall concept of the arrangement and operation of the entire controller, and showing the handle motion to obtain pitch control, one position of the handle being shown in solid lines and the other in dash lines.
Figure 2:
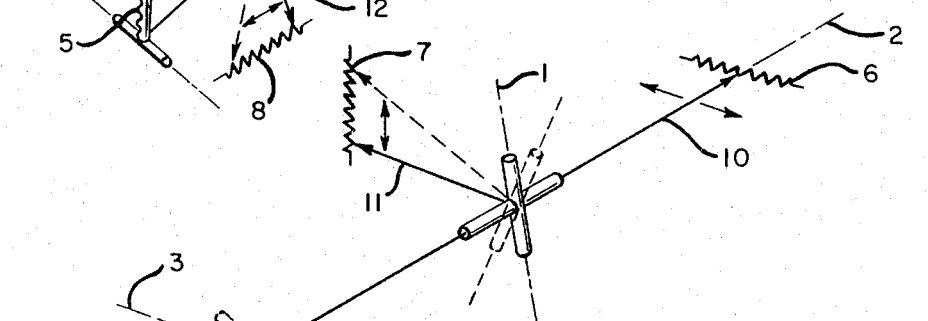
FIGURE 2 is a schematic perspective view similar to FIG. 1 but showing the handle motion to obtain roll control.
Figure 3:
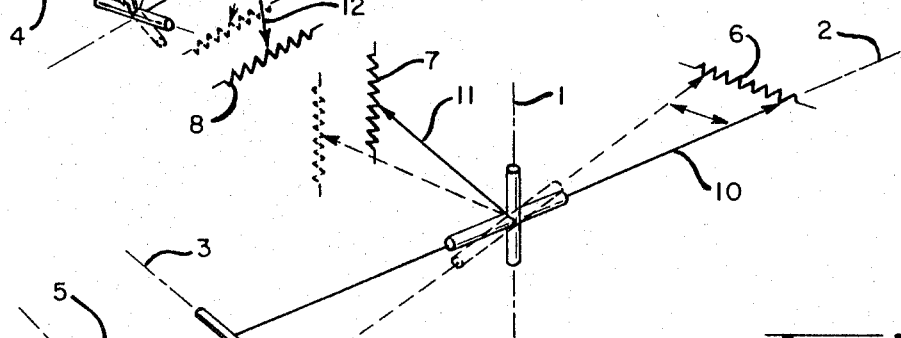
FIGURE 3 is a schematic perspective view similar to FIG. 1 but showing the handle motion to obtain yaw control.

As depicted in FIGURES 1–3 of the drawings, the controller comprises a mechanism providing four pivot axes numbered 1–4. A handle 5 is supported for pivotal movement about said axes. In order to translate motion of the handle into motion of some remote part to be controlled, the apparatus comprises three potentiometers 6–8 having control arms 10–12 which are actuated by movement of handle 5 about the various pivot axes. As shown in FIG. 3, movement of the handle about pivot axis 1 will actuate control arm 10 to adjust the potentiometer 6. Potentiometer 6 can be connected in a conventional manner to control the movement of any desired element, for example, the yaw control surface on an aircraft. As shown in FIG. 2, movement of the handle about pivot axis 2 will actuate control arm 11 to adjust the potentiometer 7 which can be connected to control the roll of an aircraft. As shown in FIG. 1, movement of the handle about pivot axis 3 will actuate control arm 12 to adjust the potentiometer 8 which can be connected to control the pitch of an aircraft.

As will be noted in FIGS. 1–3, each of the potentiometers 6–8 is arranged to move as a unit with its respective control arm when the handle is pivoted to cause operation of another of the potentiometers. The control arm of the operated potentiometer is, of course, moved relative to the potentiometer it controls. For example, in FIG. 3 potentiometer 6 is operated by movement of arm 10 relative thereto, and potentiometers 7 and 8 move with their control arms so as not to be adjusted. Although operation of the apparatus has been described with reference to separate movement about the three axes 1–3, it will be obvious to those skilled in the art that the handle can be moved in any direction to combine movement about any two or more of the axes 1–3. As will be noted in FIGS. 1–3, movement of the handle about pivot axis 4 does not operate any potentiometer. The only purpose of axis 4 is to accommodate the complex motion of an operator's hand when he tries to move handle 5 about axis 3 with the impediment of having his forearm held in a fixed position above and parallel to pivot axis 2.

An actual structural embodiment of the invention will now be described with reference to FIGS. 4–12. In order to relate FIGS. 4–12 to the description of the schematic FIGS. 1–3, the same or primed reference numbers are used where appropriate. More specifically, the actual apparatus comprises a pivot shaft 1' which forms the pivot axis 1. Shaft 1' has upper and lower stub sections 16, 17 respectively. The pivot axes 2, 3 and 4 are formed by pivot shafts 2', 3' and 4', respectively. The actual apparatus has a handle 5 and potentiometers 6, 7 and 8. The control arm mechanisms for operating the potentiometers 6, 7 and 8 are designated 10', 11' and 12', respectively.

The actual apparatus further comprises a support frame 19 having a channel-shaped lower portion providing a bottom 20 and sides 21. The upper end of each side has an inturned flange 22 on which a top 23 is mounted by means of screws 24. Top 23 is the surface on which an operator's forearm is strapped, with the hand gripping handle 5 and the wrist positioned substantially directly above the pivot shaft 1'.

Pivot shaft 1' connects a pivot member or housing 27 to the support frame top 23. Housing 27 comprises a generally rectangular block 28 having a large central bore 29 closed by end plates 30 and 31. Stub shaft 16 of pivot shaft 1' is secured to the top of block 28 and is received in a bearing 32 in top 23. Stub shaft 17 is secured to the bottom of block 28 and is received in a bearing 33 which is in turn received in an angle bracket 34 secured to top 23 by screws 35. The pivot shaft 2' is supported in housing 27 by bearings 36 in the end plates 30 and 31.

Figure 9:
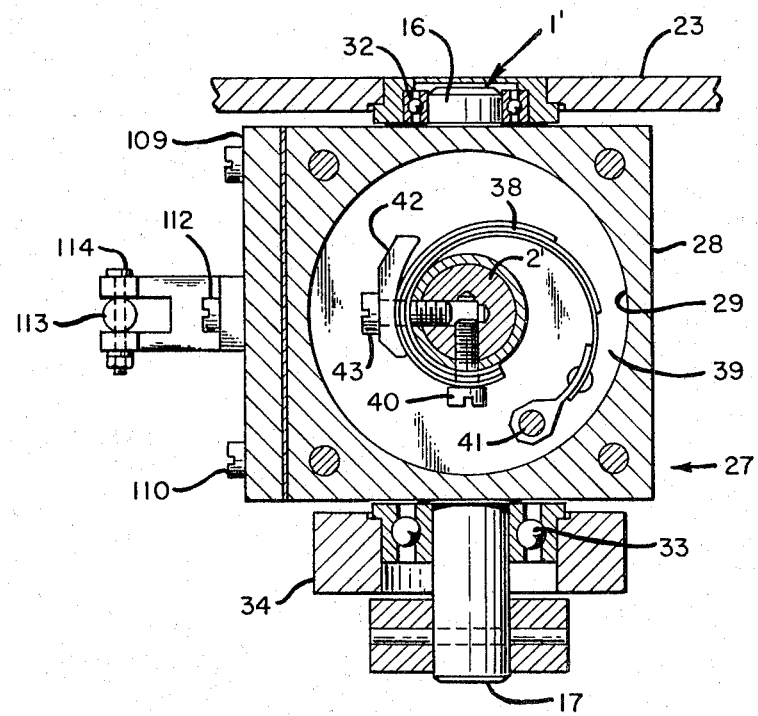
FIGURE 9 is a cross sectional view taken on the line 9—9 of FIG. 4.

FIGURE 9 shows the arrangement in housing 27 for biasing handle 5 in a centered position relative to rotation about the axis of pivot shaft 2'. More specifically, a curved leaf spring 38 is positioned in a chamber 39 formed along a portion of bore 29. One end of spring 38 is attached to shaft 2' by a screw 40 and the other end is held by a pin 41 through the end plate 30. A backing block 42 is positioned for spring 38 by a screw 43. When handle 5 is moved, for example, to turn shaft 2' counterclockwise as viewed in FIG. 9, spring 38 will be stressed to provide a corrective force tending to turn the shaft clockwise. In order to bias the shaft to the same extent for return from a clockwise motion, a second spring 38' is provided in a second chamber 39'. Chamber 39' is not shown in section because it is believed obvious that spring 38' is simply arranged to operate exactly opposite from spring 38.

Figure 10:
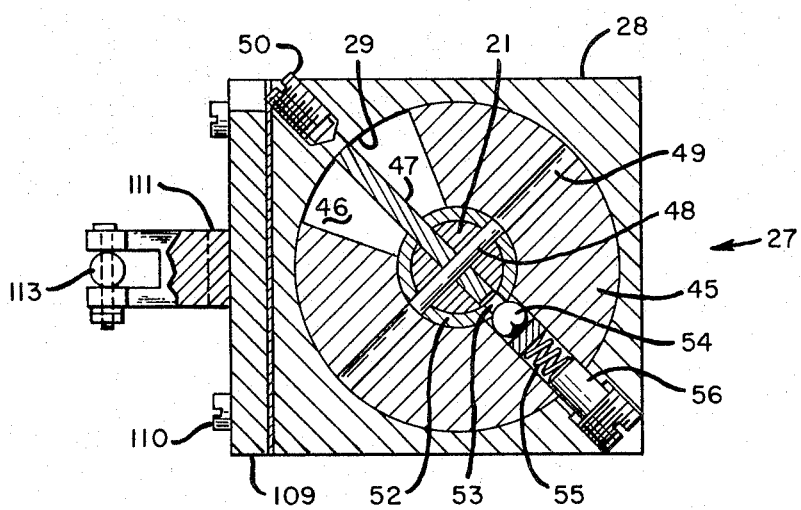
FIGURE 10 is a cross sectional view taken on the line 10—10 of FIG. 4.

FIGURE 10 shows the arrangement in housing 27 for damping the pivotal movement of handle 5 about the axis of shaft 2' and for setting a positive centered position for such pivotal movement. More specifically, a circular block 45 is sealed in the center portion of bore 29 in housing 27. The block has a recess 46 which forms a damping chamber. A paddle 47 is connected to the shaft 2' and is received in chamber 46, with the edge of the paddle closely adjacent the wall of bore 29. The connection between paddle 47 and shaft 2' is in the form of a pin 48 which can be inserted via a bore 49 in block 45. Damping liquid is placed in the damping chamber 46 through a port in the housing block 28 which is then closed by a plug 50. Thus, as shaft 2' is rotated in block 45, the paddle 45 moves through the liquid which must flow across the restricted space between the side edges of the paddle and the end walls of chamber 46 and between the outer edge of the paddle and the wall of bore 29. The tighter the sliding fit is made, the greater the damping becomes, and vice versa. The positive centering arrangement comprises a sleeve 52 positioned around shaft 2' and held in place by pin 48. The sleeve has a centering recess or detent 53 which cooperates with a ball 54 to releasably set the centered position. Ball 54 is biased toward the detent by a spring 55 held in place by a plug 56, which plug also prevents the block 45 from rotating in the housing 27.

Handle 5 is connected to shaft 2' in the following manner. The forward end of shaft 2' is attached to a second pivot member or housing 60 shown in FIGS. 4, 6, 7, 8 and 11. Housing 60 comprises a block 61 to which the shaft 2' is directly connected. Block 61 has a large central bore 62 similar to bore 29 in the pivot housing 27. Bore 62 is closed by side plates 63 and 64. Housing 60 turns as a unit with shaft 2'. Pivot shaft 3' is mounted in housing 60 for rotation in bearings 65 in the side plates 63 and 64.

Figure 8:
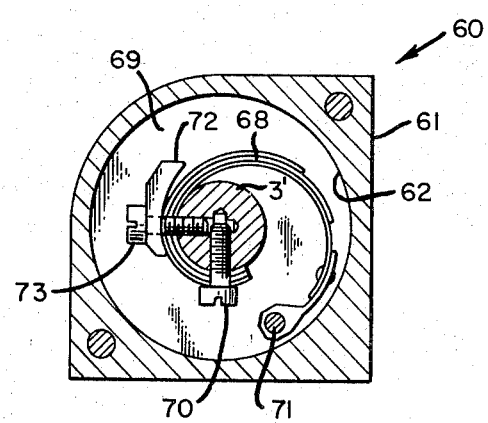
FIGURE 8 is a cross sectional view taken on the line 8—8 of FIG. 6.

FIG. 8 shows the arrangement in housing 60 for biasing handle 5 in a centered position relative to rotation about the axis of pivot shaft 3'. More specifically, a curved leaf spring 68 is positioned in a chamber 69 formed along a portion of bore 62. One end of spring 68 is attached to shaft 3' by a screw 70 and the other end is held by a pin 71 through the side plate 63. A backing block 72 is positioned for spring 68 by a screw 73. Spring 68 works in similar manner to that explained for spring 38. For example, when handle 5 is moved to turn shaft 3' counter clockwise as viewed in FIG. 8, spring 68 will be stressed to provide a corrective force tending to turn the shaft clockwise. In order to bias the shaft to the same extent for return from a clockwise motion, a second spring 68' is provided in a second chamber 69' and is arranged to operate exactly opposite from spring 68.

Figure 7:
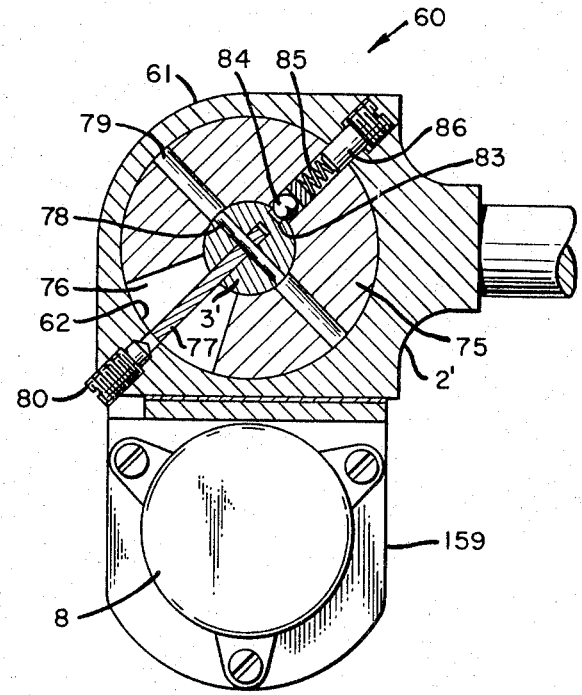
FIGURE 7 is a cross sectional view taken on the line 7—7 of FIG. 6.

FIG. 7 shows the arrangement in housing 60 for damping the pivotal movement of handle 5 about the axis of shaft 3' and for setting a positive centered position for such pivotal movement. More specifically, a circular block 75 is sealed in the center portion of bore 62 in housing 60. The block has a recess 76 which forms a damping chamber. A paddle 77 is connected to the shaft 3' and is received in chamber 76, with the edge of the paddle closely adjacent the wall of bore 62. The connection between paddle 77 and shaft 3' is in the form of a pin 78 which can be inserted via a bore 79 in block 75. Damping liquid is placed in the damping chamber 76 through a port in the housing block 61 which is then closed by a plug 80. Damping paddle 77 works in the same manner as explained for paddle 47. The positive centering arrangement comprises a centering recess or detent 83 in shaft 3' which cooperates with a ball 84 to releasably set the centered position. Ball 84 is biased toward the detent by a spring 85 held in place by a plug 86, which plug also prevents the block 75 from rotating in the housing 60.

Handle 5 is connected to the shaft 3' in the following manner. A pair of support arms 88, 89 are secured to opposite ends of shaft 3' by pins 90, 91, respectively. The distal ends of arms 88, 89 receive the ends of the pivot shaft 4' on which the handle 5 is rigidly mounted by a bolt 92. Shaft 4' is pivotally connected to arms 88, 89 by means of bearings 93. Snap rings 94 hold the shaft and bearings assembled relative to the arms 88, 89. In order to bias handle 5 to a centered position relative to movement about pivot shaft 4', coil springs 95, 96 are positioned on the shaft. A pair of ears 97, 98 (FIG. 11) project rearwardly from shaft 4' and the inner ends of springs 95, 96, respectively, are received in holes in the ears. The outer end of each of the springs is received in a lightening hole 99 on the adjacent support arm. Thus, when handle 5 is pivoted forward about the axis of shaft 4', spring 95 will be coiled to generate a return force. Similarly, when handle 5 is pivoted rearward, spring 96 will be coiled to generate a return force.

In order to prevent unwanted motion of handle 5 about shaft 4' due to acceleration forces, the apparatus is balanced about shaft 4'. The balance is accomplished by means of an inverted U-shaped member 100 secured to shaft 4' by the bolt 92. The lower end of member 100 carries a weight 101 held by a bolt 102. In order to further eliminate undesired motion due to acceleration, the mass of the handle unit is made as small as possible. More specifically, the handle is made hollow and of light weight metal, and the U-shaped member 100 is made relatively long so that the weight 101 will have a long moment arm and will therefore need only be relatively light. The arms of member 100 are provided with lightening holes 103 so that the arms themselves will not add appreciable weight. The apparatus is also balanced about pivot shaft 3' by means of counter weights 105, 106 attached to arms 88, 89 by screws 107.

Spring biased centering means and damping means have been described for controlling motion around the axes of pivot shafts 2' and 3'. The centering and damping means for motion about the axis of pivot shaft 1' will now be described, with reference to FIGS. 4, 9, 11 and 12. An angle bracket 109 is attached to the pivot housing 27 by four screws 110, for a purpose to be later described, and a yoke-shaped bracket 111 is attached to bracket 109 by screws 112. An actuating rod 113 is pivotally secured between the arms of yoke bracket 111 by a pin 114. A bungee 115 is pivotally supported on top 23 by a vertical bracket 116 having parallel horizontal arms 117, 118. Bracket 116 is attached to top 23 by screws 119, and the bracket supports the bungee by pivot pin units 120. The bungee comprises a cylinder 121 having a threaded end cap 122. Rod 113 is slidably sealed in the left end of cylinder 121 and an extension 113' is slidably sealed in the end cap. A damping piston 123 is slidably received in the cylinder and is rigidly connected to rods 113 and 113'. Centering coil springs 124, 125 are positioned on opposite sides of piston 123. Motion limiting collars 126, 127 are positioned on rods 113 and 113', respectively. The cylinder is provided with fill ports which are closed by plugs 128. Piston 123 carries a ball 129 which is forced by a spring 130 into cooperation with a detent 131 in the form of an annular groove on the inner wall of cylinder 121. Spring 130 is held in place by a threaded plug 132. As an alternative arrangement, rod 113 can be extended through piston 123 so that portion 113' is an integral part of the portion 113. In the alternative construction, the rod 113 is made of larger diameter so as to receive spring 130 and the lower end of plug 132 in a bore through the rod.

The centering and damping arrangement for motion about shaft 1' operates in the following manner. When handle 5 is swept sideways for yaw control as depicted in FIG. 3, the pivot housing 27 is caused to pivot about shaft 1'. Such pivotal movement moves shaft 113 into and out of the bungee cylinder 121. Inward movement compresses spring 125 to provide a force tending to return the piston 123 to the centered position fixed by the ball 129 and the detent 131. Similarly, outward movement compresses spring 124 to provide a return force. Movement of piston 123 in either direction is damped by the restricted flow of liquid from one side of the piston to the other. The amount of damping depends, of course, upon the fit between the periphery of the piston and the wall of the cylinder, the tighter the fit the greater the damping and vice versa.

Figure 4:
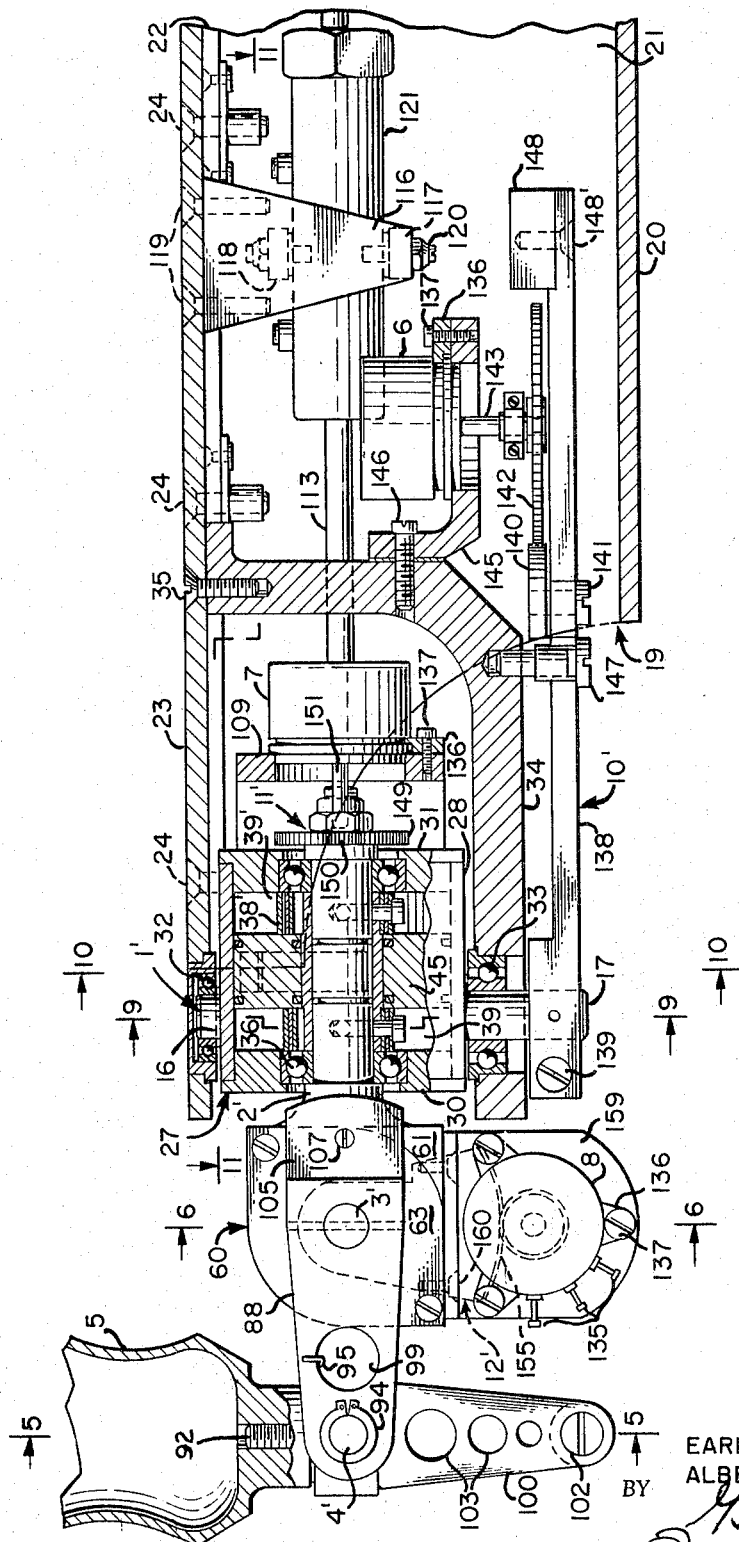
FIGURE 4 is a cross sectional view through the longitudinal axis of a preferred form of controller and showing some parts in elevation.
Figure 5:
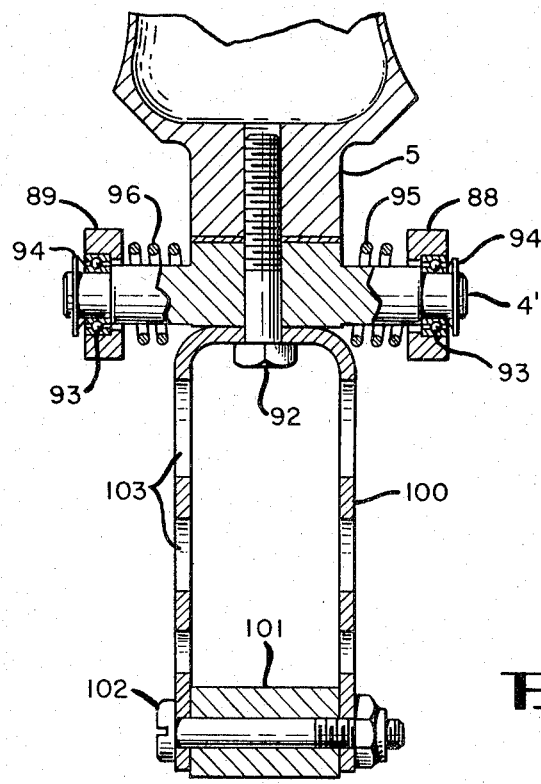
FIGURE 5 is a cross sectional view taken on the line 5—5 of FIG. 4.

As previously explained, the apparatus includes three potentiometers 6, 7 and 8. Each of the potentiometers is a conventional device provided with three terminals 135. Also, each of the potentiometers is held in place by means of three brackets 136 and three screws 137. As disclosed in FIGS. 1–3, potentiometer 6 is actuated by a control arm 10. As shown in FIGS. 4 and 11, the control arm structure 10' comprises an arm 138 clamped to stub shaft 17 by a screw 139. A gear segment 140 is connected to the arm 138 by screws 141 and engages a gear 142 secured to the drive shaft 143 of the potentiometer 6. It will be seen that potentiometer 6 is held stationary with the support frame 19 by means of a bracket 145 connected to bracket 34 by screws 146. Thus, when handle 5 is swept sideways for yaw control, arm 138 will pivot with shaft 1' and the gear segment 140 will turn the potentiometer drive gear 142 to adjust the potentiometer 6.

If it is desired to limit the controller to operation about only two axes, the control arm 138 can be rendered immobile by inserting a screw 147 through the arm 138 and up into bracket 34. It should be noted also that arm 138 is extended to the right beyond where it supports the gear segment 140. The purpose of the extension is to provide an additional moment arm for and convenient location for a counterweight 148 which is attached to the arm by a screw 148'. The mass and exact position of weight 148 are selected to provide an exact balance about shaft 1'.

As disclosed in FIGS. 1–3, potentiometer 7 is actuated by the control arm 11. As shown in FIGS. 4 and 11, the control arm structure 11' comprises a gear 149 secured on the end of shaft 2' and an inter-engaging gear 150 on the drive shaft 151 for the potentiometer 7. Potentiometer 7 is secured to the pivot housing 27 for movement therewith by means of the bracket 109. Thus, when handle 5 is rocked sideways for roll control, gear 149 will turn with shaft 2' and will drive the potentiometer gear 150 to adjust the potentiometer 7.

Figure 6:
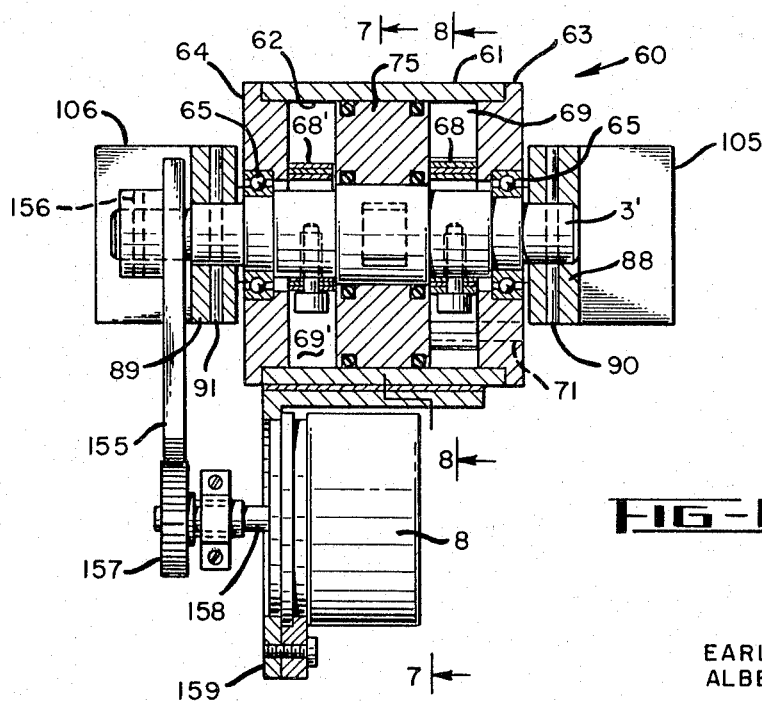
FIGURE 6 is a cross sectional view taken on the line 6—6 of FIG. 4.

As disclosed in FIGS. 1–3, potentiometer 8 is actuated by the control arm 12. As shown in FIGS. 4, 6 and 11, the control arm structure 12' comprises a gear segment 155 secured to shaft 3' by a pin 156. Segment 155 meshes with a gear 157 which is secured to the drive shaft 158 of the potentiometer 8. Potentiometer 8 is attached to the bottom of pivot housing 60 by an angle bracket 159 secured by screws 160. Thus, when handle 5 is moved about the axis of shaft 3' to control pitch, gear segment 155 will turn with shaft 3' and will drive the potentiometer gear 157 to adjust the potentiometer 8. It should be noted that when the operator moves handle 5 about shaft 3', the handle is free to move simultaneously about the shaft 4' to accommodate the combined vertical and tilting action of the operator's hand as previously described.

Although specific details of the present invention are shown and described herein, it is to be understood that modifications may be made therein without departing from the spirit and scope of the invention as set forth in the appended claims.

Having thus described the invention, what is claimed as new and desired to be secured by Letters Patent is:

1. A controller comprising a support frame, a first pivot member connected to said frame for pivotal movement as a unit about a first axis, a second pivot member connected to said first pivot member for pivotal movement relative to the first pivot member about a second axis, a handle connected to said second pivot member for pivotal movement relative to said second pivot member about a third axis, said first axis intersecting said second axis, and said third axis intersecting said second axis at a location spaced from said first axis.

2. A controller as claimed in claim 1 further comprising a third pivot member on said third axis, and a pivotal connection between said handle and said third pivot member and parallel to said third axis.

3. A controller as claimed in claim 1 further comprising resilient means for holding said handle in a centered position about each of said axes.

4. A controller as claimed in claim 1 further comprising resilient means for holding said handle in a centered position about each of said axes, and fluid damping means for resisting movement caused by said resilient means.

5. A controller as claimed in claim 1 further comprising fluid damping means for resisting movement of said handle about each of said axes.

6. A controller as claimed in claim 2 further comprising balanced weights connected to each of said pivot members for providing a balanced condition about each of said axes.

7. A controller as claimed in claim 1 further comprising means for preventing movement of said handle about said first axis.

8. A controller as claimed in claim 7 further comprising resilient means for holding said handle in a centered position about each of said axes, and fluid damping means for resisting movement caused by said resilient means.

9. A controller comprising a support frame having a surface to which an operator's forearm may be strapped, a first pivot member pivotally connected to said frame for pivotal movement about a first pivot axis substantially normal to said surface, a second pivot member pivotally connected to said first pivot member for pivotal movement about a second axis substantially normal to said first axis, a handle, and pivot means pivotally connecting said handle to said second pivot member, said pivot means comprising two parallel pivot axes in a plane substantially parallel to said surface.

10. A controller comprising a support frame having a surface to which an operator's forearm may be strapped, a handle positioned to be gripable by the hand of an operator whose arm is strapped to said surface, and means comprising two parallel pivot axes connecting said handle to said support frame.

11. A controller comprising a support frame, a first pivot housing, a first pivot shaft connecting said first housing to said support frame, a second pivot housing, a second pivot shaft normal to said first shaft and connecting said second pivot housing to said first housing, a third pivot shaft rotatably connected to said second housing, the axis of said third pivot shaft intersecting the axis of said second pivot shaft, and a handle connected to said third shaft.

12. A controller as claimed in claim 11 in which said first pivot housing comprises walls forming a chamber, and a paddle positioned in said chamber and attached to said second shaft for rotation therewith.

13. A controller as claimed in claim 11 further comprising spring means connected to said first pivot housing and said second pivot shaft and resiliently resisting rotation of said second shaft in either direction from a centered position.

14. A controller as claimed in claim 11 in which said second pivot housing comprises walls forming a chamber, a paddle positioned in said chamber and attached to said third pivot shaft for rotation therewith.

15. A controller as claimed in claim 11 further comprising spring means connected to said second pivot housing and said third pivot shaft and resiliently resisting rotation of said third shaft in either direction from a centered position.

16. A controller as claimed in claim 11 in which each of said pivot housings comprises walls forming a chamber in the respective housing, a paddle positioned in each of said chambers, means connecting the paddle in the first pivot housing to the second pivot shaft, and means connecting the paddle in the second pivot housing to the third pivot shaft.

17. A controller as claimed in claim 16 further comprising spring means connected to said first housing and said second shaft and resiliently resisting rotation of said second shaft in either direction from a centered position, and spring means connected to said second housing and said third shaft and resiliently resisting rotation of said third shaft in either direction from a centered position.

18. A controller comprising a support frame, a first pivot housing, a first pivot shaft connecting said first housing to said support frame, a second pivot housing, a second pivot shaft normal to said first shaft and connecting said second pivot housing to said first housing, a third pivot shaft connected to said second housing normal to said second shaft, a fourth pivot shaft parallel to said third shaft, means supporting said fourth shaft on said third shaft, and a handle supported by said fourth shaft.

19. A controller as claimed in claim 18 further comprising a potentiometer carried by said second pivot housing, and means for operating said potentiometer by pivotal movement of said handle about the axis of said third shaft.

20. A controller as claimed in claim 18 further comprising an operating arm connected to said first shaft for movement therewith, a potentiometer mounted on said support frame, and gear means interconnecting said operating arm and said potentiometer.

21. A controller as claimed in claim 18 further comprising a bungee cylinder attached to said support frame, a piston slidably sealed in said cylinder, and means connecting said first pivot housing to said piston whereby said piston is moved by motion of said first housing about the axis of said first pivot shaft.

22. A controller as claimed in claim 21 further comprising a spring-pressed ball carried by said piston and cooperating with a detent in said cylinder to establish a center position for said piston and spring means resisting movement of said piston in either direction from said center position.

23. A controller comprising a support frame, a first pivot housing, a first pivot shaft connected to said first housing and rotatably journalled in said support frame, a second pivot shaft rotatably journalled in said first housing normal to said first shaft, a second pivot housing mounted on said second pivot shaft outside said first housing, a third pivot shaft rotatably journalled in said second housing, a handle connected to said third shaft, a first potentiometer supported by said first pivot housing, and means for operating said potentiometer by movement of said handle about the axis of said second shaft.

24. A controller as claimed in claim 23 further comprising a second potentiometer supported by said second pivot housing, and means for operating said second potentiometer by pivotal movement of said handle about the axis of said third shaft.

25. A controller as claimed in claim 23 further comprising a third potentiometer mounted on said support frame, and means for operating said third potentiometer by movement of said handle about the axis of said first shaft.

26. A controller comprising a support frame, a first pivot housing, a first pivot shaft connecting said first housing to said support frame, a second pivot housing, a second pivot shaft normal to said first shaft and connecting said second pivot housing to said first housing, a handle, support arm means having one end connected to said handle, a third pivot shaft connected to the other end of said support arm means for operatively connecting said handle to said second housing, and counterweight means providing a balanced condition about said third shaft.

27. A controller as claimed in claim 26 further comprising a fourth pivot shaft connected to said handle, said fourth shaft being parallel to said third shaft, and counterweight means providing a balanced condition about said fourth shaft.

28. A controller as claimed in claim 26 further comprising counterweight means providing a balanced condition about said first shaft.

29. A controller as claimed in claim 28 further comprising a fourth pivot shaft connected to said handle, said fourth shaft being parallel to said third shaft, and counterweight means providing a balanced condition about said fourth shaft.

30. A controller comprising a support frame, a first pivot housing, a first pivot shaft connecting said first housing to said support frame, a second pivot shaft rotatably journalled in said first housing normal to said first shaft, a second pivot housing mounted on said second pivot shaft outside said first housing, a third pivot shaft rotatably journalled in said second housing normal to said second shaft, a fourth pivot shaft parallel to said third shaft, means supporting said fourth shaft on said third shaft, a handle supported by said fourth shaft, counterweight means providing a balanced condition about each of said first, third and fourth shafts, a first potentiometer mounted on said support frame, means for operating said first potentiometer by pivotal movement of said handle about the axis of said first shaft, a second potentiometer mounted on said first pivot housing, means for operating said second potentiometer by pivotal movement of said handle about the axis of said second shaft, a third potentiometer mounted on said second pivot housing, means for operating said third potentiometer by pivotal movement of said handle about the axis of said third shaft, and resilient means for resisting movement of said handle from a centered position about the axis of each of said first, second and third shafts.

31. A controller as claimed in claim 30 in which said first and second pivot housings each comprises walls forming a chamber and a paddle on each of said second and third shafts in its respective chamber.

32. A controller as claimed in claim 31 in which said second shaft and first housing have a cooperating spring-pressed ball and detent for establishing said centered position about said second shaft, and said third shaft and second housing have a cooperating spring-pressed ball and detent for establishing said centered position about said third shaft.

33. A controller comprising a support frame, a pivot housing connected to said support frame, a shaft mounted in said housing for rotation relative thereto, said housing having a bore therein coaxial with said shaft, a circular block received in said bore and having a central hole through which said shaft passes, a recess in said block, and a paddle in said recess and connected to said shaft.

34. A controller as claimed in claim 33 in which a radial bore passes through said block and said housing, a locking pin positioned in said radial bore to prevent rotation of said block relative to said housing, a ball in said radial bore engageable with a detent moveable with said shaft, and a compression spring between said locking pin and said ball.

35. A controller as claimed in claim 34 further comprising spring means in said coaxial bore in said housing, said spring means being connected to said shaft and to said housing to bias said shaft to a centered position in which said ball engages said detent.

References Cited by the Examiner
UNITED STATES PATENTS 2,455,584  12/1948  Jamison _____ 244—83
3,011,739  12/1961  Boyce et al.

References Cited by the Applicant
UNITED STATES PATENTS 3,017,142  1/1962  Rossire.
3,028,126  4/1962  Holleman.

MILTON KAUFMAN, *Primary Examiner.*